(12) United States Patent
Ito

(10) Patent No.: US 11,159,754 B2
(45) Date of Patent: Oct. 26, 2021

(54) IMAGING DEVICE AND SIGNAL PROCESSING DEVICE

(71) Applicant: CANON KABUSHIKI KAISHA, Tokyo (JP)

(72) Inventor: Maasa Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/004,305

(22) Filed: Aug. 27, 2020

(65) Prior Publication Data

US 2021/0067718 A1    Mar. 4, 2021

(30) Foreign Application Priority Data

Sep. 2, 2019  (JP) .............................. JP2019-159426

(51) Int. Cl.
| | |
|---|---|
| H04N 5/359 | (2011.01) |
| H04N 9/04 | (2006.01) |
| H04N 5/367 | (2011.01) |
| H04N 5/355 | (2011.01) |

(52) U.S. Cl.
CPC ....... *H04N 5/3591* (2013.01); *H04N 5/35581* (2013.01); *H04N 5/3675* (2013.01); *H04N 9/04511* (2018.08)

(58) Field of Classification Search
CPC ............. H04N 5/3591; H04N 9/04511; H04N 5/3675; H04N 5/35581; H04N 9/04553
USPC ........................................................ 348/294
See application file for complete search history.

(56) References Cited

U.S. PATENT DOCUMENTS

| | | | |
|---|---|---|---|
| 8,456,546 B2 | 6/2013 | Oike | |
| 8,908,065 B2 | 12/2014 | Oike | |
| 9,036,060 B2 | 5/2015 | Kaizu | |
| 10,356,286 B2 | 7/2019 | Ito et al. | ................. H04N 3/155 |
| 10,791,251 B2 | 9/2020 | Ito et al. | ................. H04N 3/155 |
| 2008/0291296 A1* | 11/2008 | Oike | .................... H04N 5/3591 |
| | | | 348/234 |
| 2012/0268627 A1 | 10/2012 | Oike | |
| 2015/0022703 A1 | 1/2015 | Oike | |

(Continued)

FOREIGN PATENT DOCUMENTS

| | | |
|---|---|---|
| JP | 2008-294698 | 12/2008 |
| JP | 2013-38504 | 2/2013 |
| JP | 2019-62286 | 4/2019 |

*Primary Examiner* — Lin Ye
*Assistant Examiner* — Chan T Nguyen
(74) *Attorney, Agent, or Firm* — Venable LLP

(57) ABSTRACT

An imaging device includes an image pickup device having pixels and a correction processing unit that corrects signals output from the image pickup device, the pixels include a visible light pixel that receives light corresponding to a visible light wavelength range and an infrared light pixel that is arranged adjacent to the visible light pixel and receives light corresponding to an infrared wavelength range, and the correction processing unit includes a calculation unit that performs a first process of reducing, from a signal of the infrared light pixel, a component in the pixel signal of the infrared light pixel and based on an inflow amount of charges to the infrared light pixel from another pixel adjacent to the infrared light pixel and a second process of obtaining a signal corresponding to a difference between pixel signals of the visible light pixel and the infrared light pixel after the first process.

17 Claims, 10 Drawing Sheets

(56) References Cited

U.S. PATENT DOCUMENTS

2015/0062347 A1\* 3/2015 Jin ..................... H04N 9/0451
                                                                 348/164
2019/0349539 A1\* 11/2019 Motonaga ......... H04N 5/36961
2019/0387190 A1 12/2019 Ito ........................ H04N 5/06

\* cited by examiner

FIG. 3

| R | G | R | G |
|---|---|---|---|
| IR | B | IR | B |
| R | G | R | G |
| IR | B | IR | B |

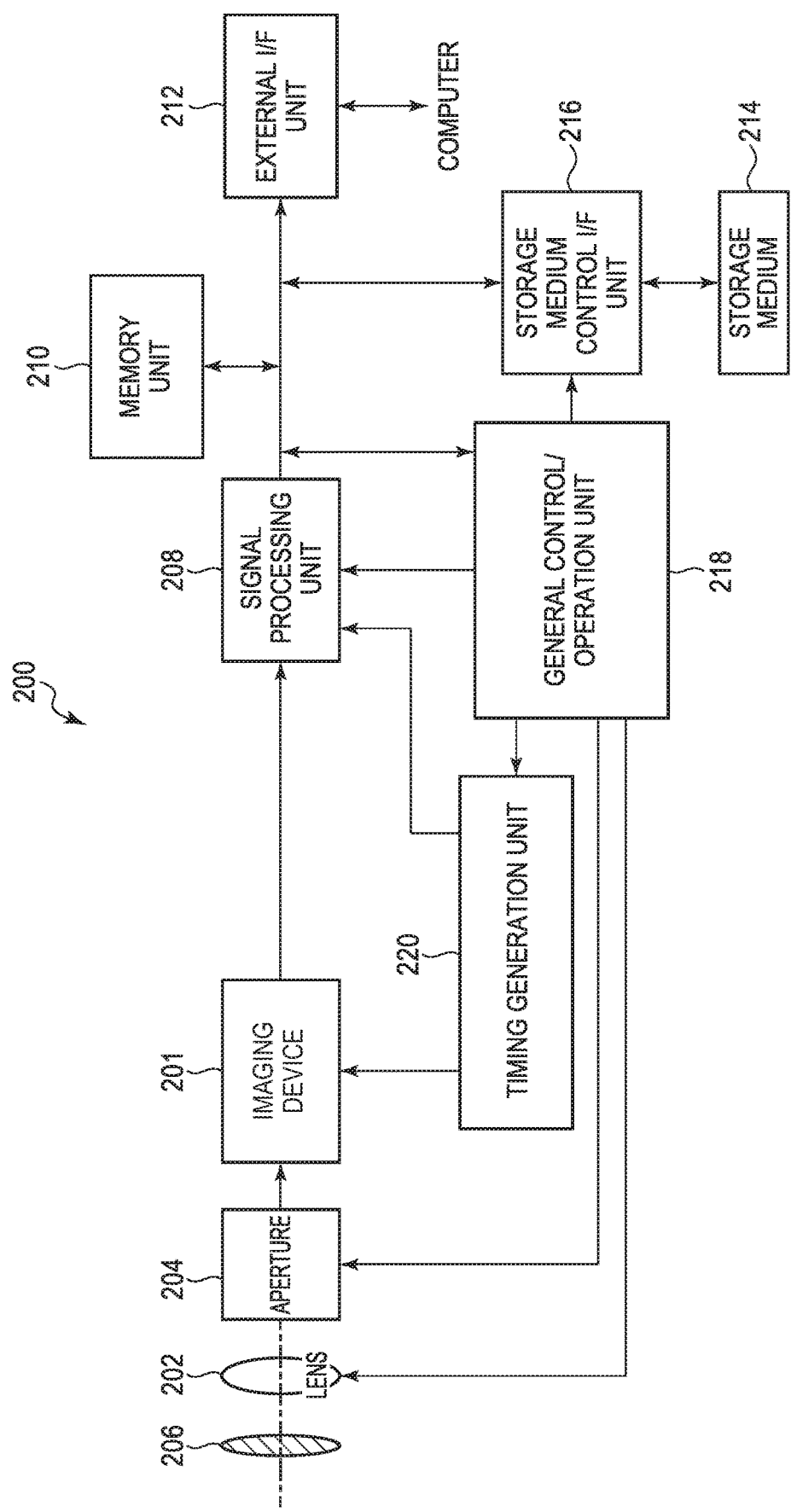

ional cameras, there is a demand for an increase in number of pixels without a change in the size of the element. Due to a significant reduction in size of the pixel caused by such a demand, there is a problem of significant influence of a color mixture component due to blooming, which makes it difficult to correctly reproduce the color of an obtained image. Japanese Patent Application Laid-Open No. 2013-038504 discloses a technique that corrects color mixture due to blooming in the field of electronic cameras.

IMAGING DEVICE AND SIGNAL PROCESSING DEVICE

BACKGROUND OF THE INVENTION

Field of the Invention

The present invention relates to an imaging device and a signal processing device.

Description of the Related Art

In recent years, in solid-state image pickup devices such as a CMOS image sensor used for an electronic camera, there is a demand for an increase in number of pixels without a change in the size of the element. Due to a significant reduction in size of the pixel caused by such a demand, there is a problem of significant influence of a color mixture component due to blooming, which makes it difficult to correctly reproduce the color of an obtained image. Japanese Patent Application Laid-Open No. 2013-038504 discloses a technique that corrects color mixture due to blooming in the field of electronic cameras.

On the other hand, there is a demand for an electronic camera having sensitivity to, in addition to visible light, light having a wavelength outside the visible light wavelength range, such as infrared light (including near-infrared light). In general, with respect to image pickup device including pixels (IR pixels) having sensitivity to the infrared wavelength range and pixels (visible light pixels) having sensitivity to the visible light wavelength range, sensitivity of the IR pixels is lower than that of the visible light pixels. This is because the visible light pixels also have sensitivity to infrared light. Thus, the visible light pixels are saturated earlier than the IR pixels. Therefore, in an image pickup device having the IR pixels and the visible light pixels, influence of color mixture due to blooming from the visible light pixels to the IR pixels is particularly increased, and correct color reproduction or correct information on the near-infrared wavelength range is not obtained in some cases.

In electronic cameras used for medical devices or analytical applications such as agriculture, biomedical research, or food sorting, it is important that, even if pixels having sensitivity to green wavelength range are saturated, correct output values and correct output ratios can be obtained from other visible light pixels and IR pixels. To obtain the correct output values and the correct output ratios, it is necessary to remove a color mixture component due to blooming and remove a near-infrared component included in output values of the visible light pixels.

The technique according to Japanese Patent Application Laid-Open No. 2013-038504 estimates a blooming component from two types of pixel signals acquired under different capturing conditions of the exposure time period and performs color mixture correction. In this technique, however, it is not possible to adjust the blooming component and the near-infrared component to be subtracted from the pixel data to be corrected in accordance with a saturated pixel, and it is not always possible to obtain correct output values.

SUMMARY OF THE INVENTION

The present invention intends to provide an imaging device and a signal processing device that can realize blooming correction with high accuracy for output signals of an image pickup device including visible light pixels and infrared light pixels.

According to one aspect of the present invention, provided is an imaging device including: an image pickup device having a plurality of pixels and a correction processing unit that corrects a signal output from the image pickup device, the plurality of pixels include a visible light pixel that receives light corresponding to a visible light wavelength range and an infrared light pixel that is arranged adjacent to the visible light pixel and receives light corresponding to an infrared wavelength range, and the correction processing unit includes a calculation unit that performs a first process of reducing, from a pixel signal of the infrared light pixel, a component that is included in the pixel signal of the infrared light pixel and is based on an inflow amount of charges to the infrared light pixel from other pixel adjacent to the infrared light pixel and a second process of obtaining a signal corresponding to a difference between a pixel signal of the visible light pixel and a pixel signal of the infrared light pixel obtained after the first process.

Further, according to another aspect of the present invention, provided is a signal processing device that processes a signal output from an image pickup device including a plurality of pixels and includes a calculation unit that performs a first process of subtracting, from a pixel signal of an infrared light pixel that receives light corresponding to an infrared wavelength range, a component based on an inflow amount of charges to the infrared light pixel from other pixel adjacent to the infrared light pixel and a second process of obtaining a signal corresponding to a difference between a pixel signal of a visible light pixel and a pixel signal of the infrared light pixel obtained after the first process.

Further, according to yet another aspect of the present invention, provided is a signal processing method for processing a signal output from an image pickup device including a plurality of pixels, and the signal processing method includes: reducing, from a pixel signal of an infrared light pixel that receives light corresponding to an infrared wavelength range, a component that is included in the pixel signal of the infrared light pixel and is based on an inflow amount of charges to the infrared light pixel from other pixel adjacent to the infrared light pixel; and obtaining a signal corresponding to a difference between a pixel signal of a visible light pixel and a pixel signal of the infrared light pixel obtained after the component based on the inflow amount of charges to the infrared light pixel from the other pixel is reduced.

Further features of the present invention will become apparent from the following description of exemplary embodiments with reference to the attached drawings.

BRIEF DESCRIPTION OF THE DRAWINGS

FIG. 3 is a diagram illustrating CF arrangement of the image pickup device in the imaging device according to the first embodiment of the present invention.

FIG. 9 is a block diagram illustrating a general configuration of an imaging system according to a third embodiment of the present invention.

DESCRIPTION OF THE EMBODIMENTS

Preferred embodiments of the present invention will now be described in detail in accordance with the accompanying drawings.

First Embodiment

Figure 1:
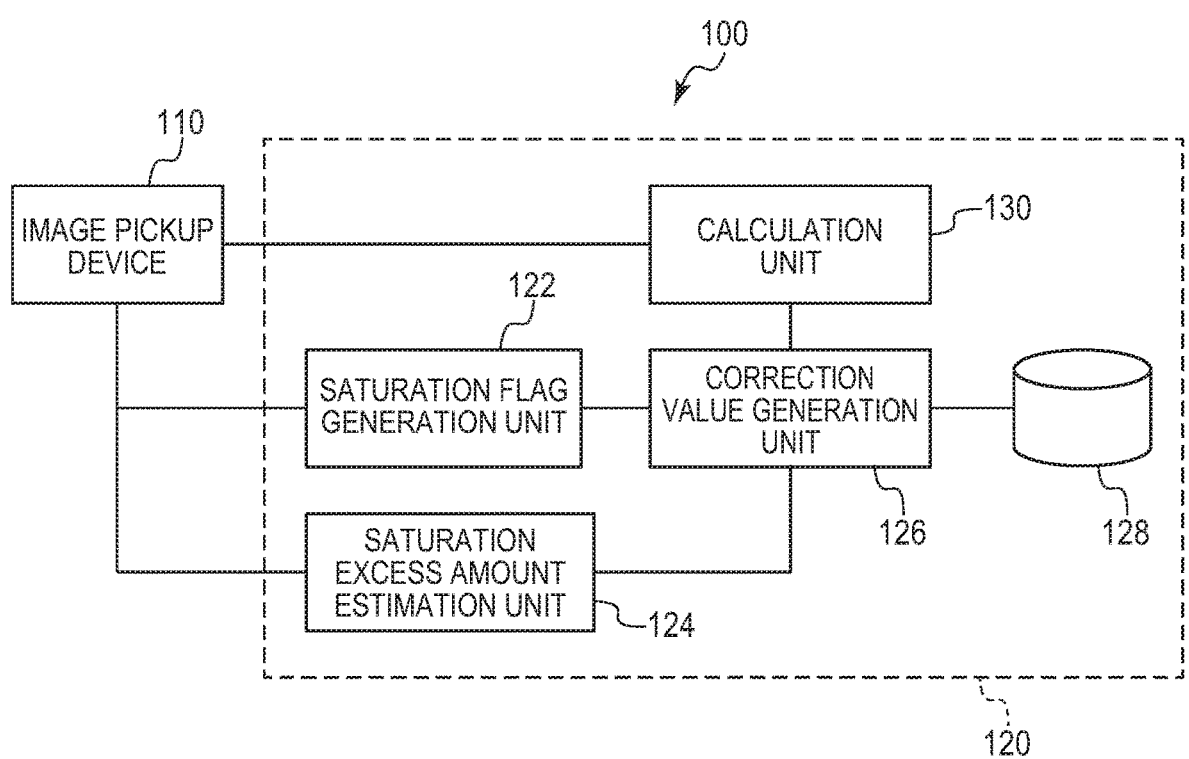
FIG. 1 is a block diagram illustrating a general configuration of an imaging device according to a first embodiment of the present invention.
Figure 2:
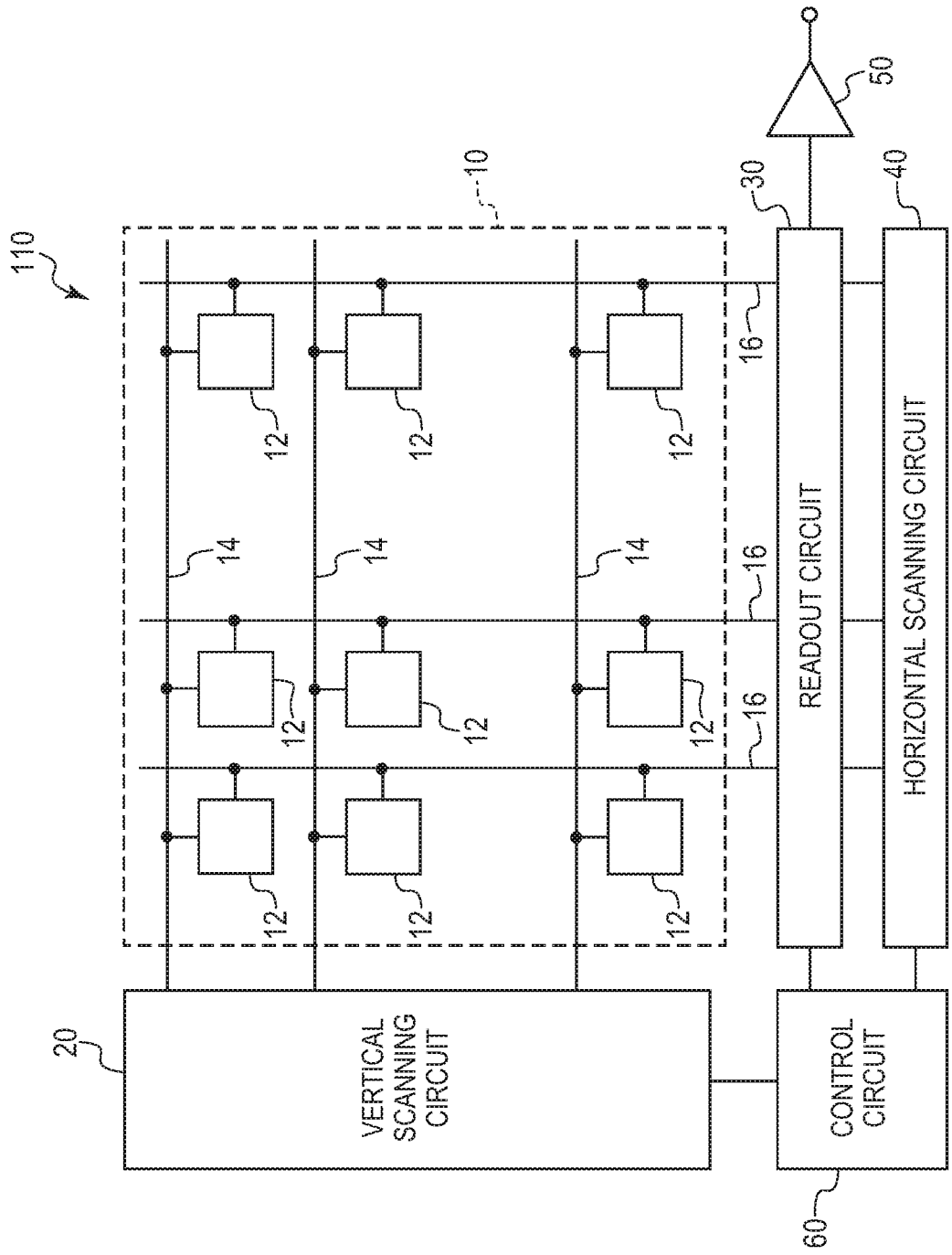
FIG. 2 is a block diagram illustrating a configuration example of an image pickup device in the imaging device according to the first embodiment of the present invention.
Figure 3:
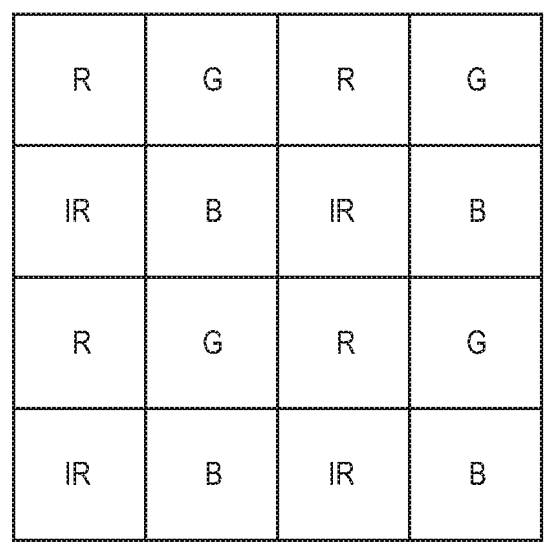

The structure of an imaging device according to a first embodiment of the present invention will be described with reference to FIG. 1 to FIG. 3. FIG. 1 is a block diagram illustrating a general configuration of the imaging device according to the present embodiment. FIG. 2 is a block diagram illustrating a configuration example of an image pickup device in the imaging device according to the present embodiment. FIG. 3 is a diagram illustrating color filter arrangement (hereinafter, referred to as CF arrangement) of the image pickup device in the imaging device according to the present embodiment.

As illustrated in FIG. 1, an imaging device 100 according to the present embodiment includes an image pickup device 110 and a correction processing unit 120. As illustrated in FIG. 1, the correction processing unit 120 includes a saturation flag generation unit 122, a saturation excess amount estimation unit 124, a correction value generation unit 126, a correction coefficient storage unit 128, and a calculation unit 130. The image pickup device 110 is connected to the saturation flag generation unit 122, the saturation excess amount estimation unit 124, and the calculation unit 130. The correction value generation unit 126 is connected to the saturation flag generation unit 122, the saturation excess amount estimation unit 124, the correction coefficient storage unit 128, and the calculation unit 130.

The image pickup devices 110 includes a plurality of pixels each including a photoelectric converter, and each of the plurality of pixels outputs a pixel signal in accordance with an incident light amount.

The saturation flag generation unit 122 is a function block that determines whether or not a pixel signal value output from the image pickup device 110 reaches a saturation level and generates a saturation flag in accordance with the determination result. The saturation level is a pixel signal value corresponding to the maximum charge amount that can be accumulated in each of the pixels 12 as signal charges. The charge amount corresponding to the saturation level is a saturation charge amount of the pixel 12.

The saturation excess amount estimation unit 124 is a function block that estimates a saturation excess amount when a pixel signal value output from the image pickup device 110 reaches the saturation level. The saturation excess amount is a difference between an output level expected for the actual incident light amount when it is assumed that the pixel is not saturated and the saturation level of the pixel signal.

The correction coefficient storage unit 128 is a memory device that stores a correction efficient (blooming ratio described later) used when calculating a blooming component superimposed on a pixel signal.

The correction value generation unit 126 is a block that calculates a correction value corresponding to the blooming component superimposed on a pixel signal based on a saturation flag output from the saturation flag generation unit 122 and a correction coefficient stored in the correction coefficient storage unit 128.

The calculation unit 130 is a function block that subtracts the correction value generated by the correction value generation unit 126 from a pixel signal value output from the image pickup device 110 to generate blooming component removal data. Further, the calculation unit 130 is also a function block that subtracts blooming component removal data of an infrared light pixel from blooming component removal data of a visible light pixel to generate pixel signal correction data.

Note that at least a part of the function included in the correction processing unit 120 may be configured to be performed by a signal processing device that is different from the imaging device 100.

As illustrated in FIG. 2, the image pickup device 110 includes a pixel unit 10, a vertical scanning circuit 20, a readout circuit 30, a horizontal scanning circuit 40, an output circuit 50, and a control circuit 60.

A plurality of pixels 12 arranged in a matrix over a plurality of rows and a plurality of columns are provided in the pixel unit 10. Each pixel 12 includes a photoelectric converter formed of a photoelectric conversion element such as a photodiode and outputs a pixel signal corresponding to a light amount of incident light. The number of rows and the number of columns of a pixel array arranged in the pixel unit 10 are not particularly limited. Further, in addition to an effective pixel that outputs a pixel signal corresponding to the light amount of incident light, an optical black pixel in which the photoelectric converter is shielded from light, a dummy pixel that does not output a signal, or the like may be arranged in the pixel unit 10.

On each pixel 12 arranged on the pixel unit 10, a color filter having a predetermined spectral sensitivity characteristic is arranged in the CF arrangement illustrated in FIG. 3, for example. In FIG. 3, each of the rectangle regions corresponds to one pixel 12. That is, FIG. 3 illustrates the CF arrangement corresponding to a pixel array of four rows by four columns.

The CF arrangement illustrated in FIG. 3 includes red color transmission filters R, green color transmission filters G, blue color transmission filters B, and infrared light transmission filters IR. The red color transmission filter R has higher optical transmittance of the red wavelength range than other filters. The green color transmission filter G has higher optical transmittance of the green wavelength range than other filters. The blue color transmission filter B has higher optical transmittance of the blue wavelength range than other filters. The infrared transmission filter IR has higher optical transmittance of the infrared wavelength range than other filters. In the CF arrangement in FIG. 3, a pixel array of two rows by two columns is the minimum unit block, and the pixel unit 10 including a predetermined number of pixels 12 is formed by repetition of arrangement of these unit blocks in the row direction and the column direction.

In the following description, the pixel 12 in which the red color transmission filter R is arranged may be referred to as a "R pixel". The R pixel is a pixel 12 that receives light in the red wavelength range. Further, the pixel 12 in which the green color transmission filter G is arranged may be referred to as a "G pixel". The G pixel is a pixel 12 that receives light in the green wavelength range. Further, the pixel 12 in which the blue color transmission filter B is arranged may be referred to as a "B pixel". The B pixel is a pixel 12 that receives light in the blue wavelength range. Further, the pixel 12 in which the infrared light transmission filter IR is arranged may be referred to as a "IR pixel". The IR pixel is a pixel 12 that receives light in the infrared wavelength range. Further, R pixels, G pixels, and B pixels are collectively referred to as "visible light pixel(s)", and in view of contrast to the visible light pixels, IR pixels may be referred to as "infrared light pixel(s)".

On each row of the pixel array of the pixel unit 10, a control line 14 is arranged extending in a first direction (horizontal direction in FIG. 2). Each of the control lines 14 is connected to the pixels 12 aligned in the first direction, respectively, to form a signal line common to these pixels 12. The first direction in which the control lines 14 are extending may be referred to as a row direction or a horizontal direction. The control lines 14 are connected to the vertical scanning circuit 20.

On each column of the pixel array of the pixel unit 10, an output line 16 is arranged extending in a second direction (vertical direction in FIG. 2) that is perpendicular to the first direction. Each of the output lines 16 is connected to the pixels 12 aligned in the second direction, respectively, to form a signal line common to these pixels 12. The second direction in which the output lines 16 are extending may be referred to as a column direction or a vertical direction. The output lines 16 are connected to the readout circuit 30.

The vertical scanning circuit 20 is a control circuit unit that supplies, to the pixels 12, control signals used for driving the readout circuits inside the pixels 12 when reading out a signal from the pixel 12 via the control lines 14 provided on each row of the pixel array. The vertical scanning circuit 20 may be formed of a shift register or an address decoder. The vertical scanning circuit 20 drives the pixels 12 of the pixel unit 10 on a row basis by the control signals supplied via the control lines 14. The signals read out from the pixels 12 on a row basis are input to the readout circuit 30 via the output lines 16 provided on each column of the pixel array.

The readout circuit 30 is a circuit unit that performs predetermined processing, for example, signal processing such as an amplification process, an analog-to-digital conversion process, a correlated double sampling process, or the like on pixel signals read out from the pixels 12.

The horizontal scanning circuit 40 is a circuit unit that supplies, to the readout circuit 30, control signals used for transferring pixel signals processed by the readout circuit 30 to the output circuit 50 sequentially on a column basis. The horizontal scanning circuit 40 may be formed of a shift register or an address decoder.

The output circuit 50 is a circuit unit formed of a buffer amplifier, a differential amplifier, or the like and configured to perform predetermined signal processing on a pixel signal of a column selected by the horizontal scanning circuit 40 and output the processed pixel data to the correction processing unit 120. The signal processing performed by the output circuit 50 may be an amplification process, a digital correlated double sampling (CDS) process, or the like.

The control circuit 60 is a circuit unit used for supplying, to the vertical scanning circuit 20, the readout circuit 30, and the horizontal scanning circuit 40, control signals that control the operations of the above or the timings thereof. Some or all of the control signals supplied to the vertical scanning circuit 20, the readout circuit 30, and the horizontal scanning circuit 40 may be supplied from the outside of the image pickup device 110.

Figure 5:
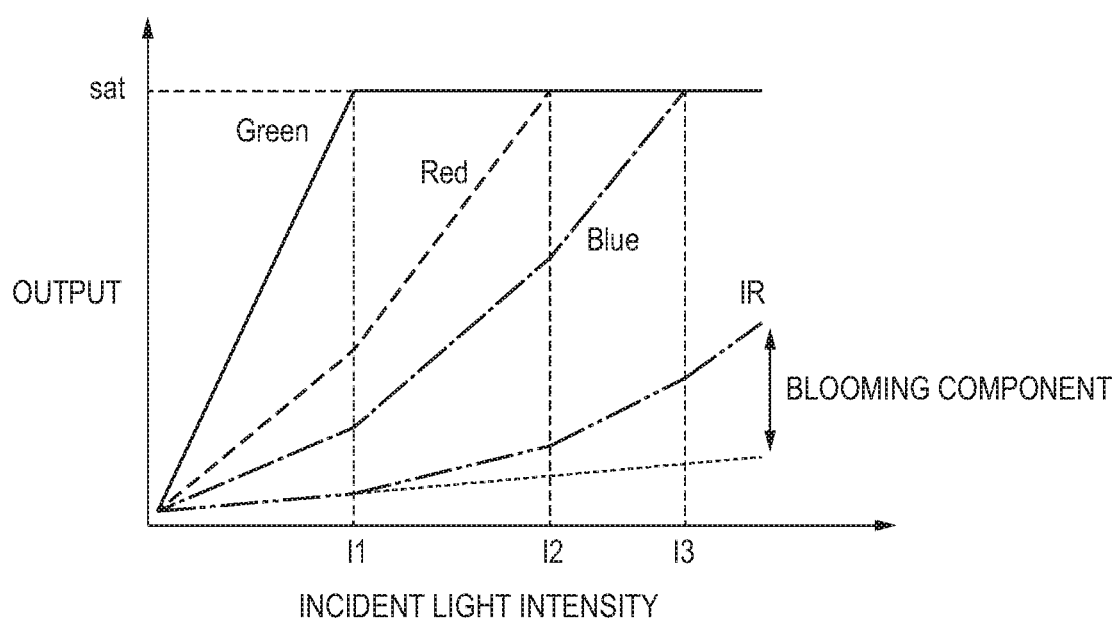
FIG. 5 is a graph illustrating an example of a relationship between the output of pixels and the incident light intensity.
Figure 6:
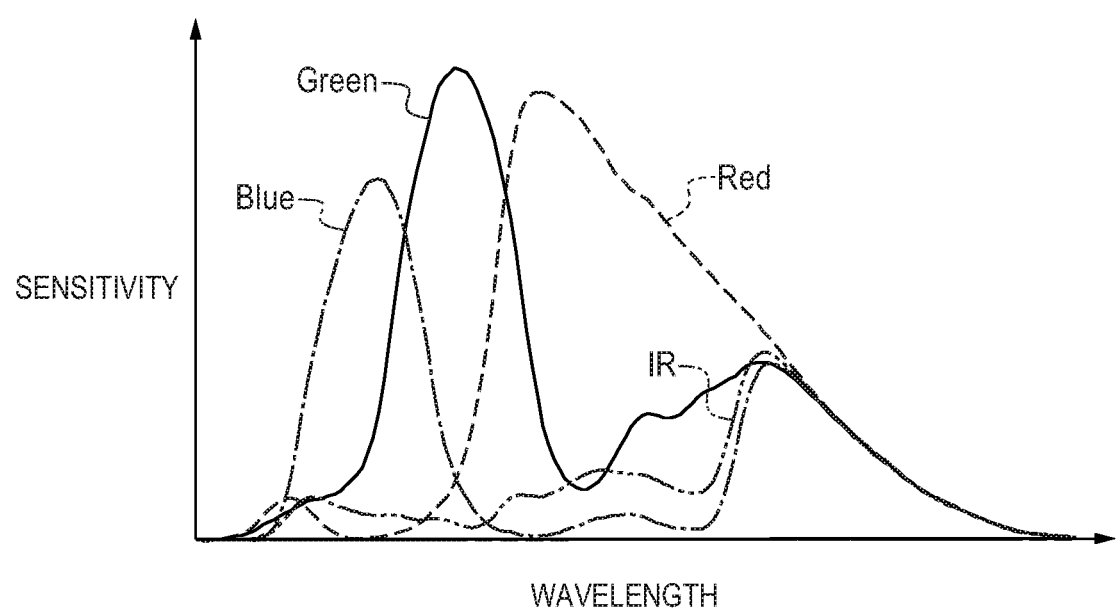
FIG. 6 is a graph illustrating an example of spectral sensitivity characteristics in R pixels, G pixels, B pixels, and IR pixels.

Next, before specifically illustrating the operations of the imaging device according to the present embodiment, blooming that may occur in the pixel unit 10 of the image pickup device 110 will be described with reference to FIG. 4A to FIG. 6. FIG. 4A to FIG. 4D are schematic diagrams illustrating forms of blooming that may occur in the image pickup device of the imaging device according to the present embodiment. FIG. 5 is a graph illustrating an example of a relationship between the output of the pixels and the incident light intensity. FIG. 6 is a graph illustrating an example of spectral sensitivity characteristics in the R pixel, the G pixel, the B pixel, and the IR pixel.

Blooming is a phenomenon in which an amount of signal charges generated in one pixel exceeds a saturation charge amount of the pixel and overflows to an adjacent pixel, signal line, or the like. Since the pixels 12 each having a different color sensitivity are arranged adjacent to each other in a color sensor, occurrence of blooming causes color mixture, which reduces color reproducibility.

In the image pickup device 110 with the CF arrangement illustrated in FIG. 3, blooming may occur in each form illustrated in FIG. 4A to FIG. 4D, for example.

Figure 4A:
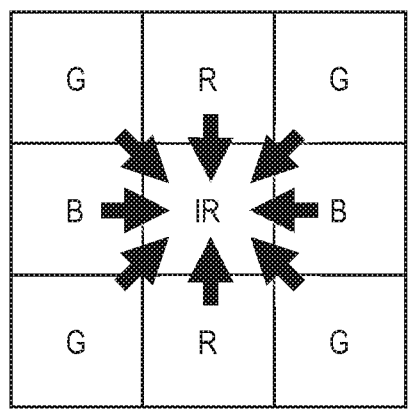
FIG. 4A, FIG. 4B, FIG. 4C and FIG. 4D are schematic diagrams illustrating forms of blooming that may occur in the image pickup device of the imaging device according to the first embodiment of the present invention.

FIG. 4A is a diagram schematically illustrating inflow of signal charges from adjacent pixels to an IR pixel. As illustrated in FIG. 4A, eight pixels 12 in total including two R pixels, four G pixels, and two B pixel are arranged on the periphery of an IR pixel. When signal charges exceeding the saturation charge amount are generated in at least one of these R pixels, G pixels, and B pixels on the periphery, excessive signal charges unable to be accumulated any more in the at least one pixel may flow out and flow into the central IR pixel.

Figure 4B:
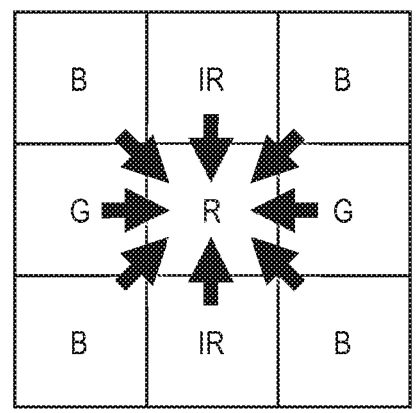

FIG. 4B is a diagram schematically illustrating inflow of signal charges from adjacent pixels to an R pixel. As illustrated in FIG. 4B, eight pixels 12 in total including two G pixels, four B pixels, and two IR pixel are arranged on the periphery of an R pixel. When signal charges exceeding the saturation charge amount are generated in at least one of these G pixels, B pixels, and IR pixels on the periphery, excessive signal charges unable to be accumulated any more in the at least one pixel may flow out and flow into the central R pixel.

Figure 4C:
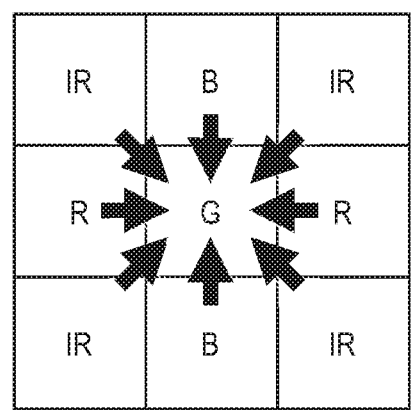

FIG. 4C is a diagram schematically illustrating inflow of signal charges from adjacent pixels to a G pixel. As illustrated in FIG. 4C, eight pixels 12 in total including two R pixels, two B pixels, and four IR pixel are arranged on the periphery of a G pixel. When signal charges exceeding the saturation charge amount are generated in at least one of these R pixels, B pixels, and IR pixels on the periphery, excessive signal charges unable to be accumulated any more in the at least one pixel may flow out and flow into the central G pixel.

Figure 4D:
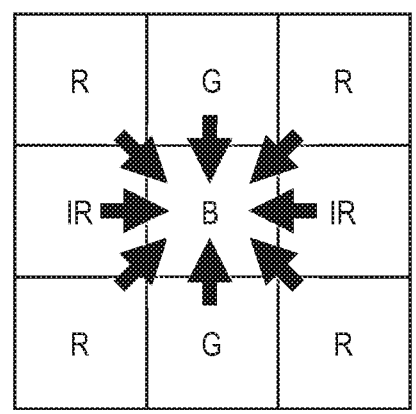

FIG. 4D is a diagram schematically illustrating inflow of signal charges from adjacent pixels to a B pixel. As illustrated in FIG. 4D, eight pixels 12 in total including four R pixels, two G pixels, and two IR pixel are arranged on the periphery of a B pixel. When signal charges exceeding the saturation charge amount are generated in at least one of these R pixels, G pixels, and IR pixels on the periphery, excessive signal charges unable to be accumulated any more in the at least one pixel may flow out and flow into the central B pixel.

Note that, while one pixel influenced by blooming is focused on in FIG. 4A to FIG. 4D, each of the plurality of pixels 12 forming the pixel unit 10 may be any of the pixel that causes blooming and the pixel influenced by blooming.

FIG. 5 is a graph illustrating an example of a relationship between the output of the pixels 12 and the incident light intensity. In the graph, a solid line represents a characteristic of G pixels, a broken line represents a characteristic of R pixels, a dash-dot-dash line represents a characteristic of B pixels, and a dash-dot-dot-dash line represents a characteristic of IR pixels. Note that, for simplified illustration, it is assumed here that light of uniform intensity enters the entire pixel unit 10 and the output of the pixel 12 for the incident light is larger in ascending order from G pixels, R pixels, B pixels, and IR pixels. Practically, which pixel of the G pixel, the B pixel, or the IR pixel has larger output differs in accordance with a captured object.

Once the amount of signal charges generated in the photoelectric converter of the pixel 12 exceeds the saturation charge amount of the pixel 12, signal charges are unable to be accumulated any more, and thereby the output of the pixel 12 is saturated. The output level of the pixel 12 corresponding to the amount of signal charges (saturation charge amount) at this time is a saturation level sat. In the example illustrated in FIG. 5, the output of the G pixels reaches the saturation level sat when the incident light intensity is I1, the output of the R pixels reaches the saturation level sat when the incident light intensity is I2, and the output of the B pixels reaches the saturation level sat when the incident light intensity is I3.

In general, the relationship between the incident light intensity and the output of the pixel 12 is proportional, and the output of the pixel 12 linearly increases as the incident light intensity increases. As illustrated in FIG. 5 with the solid line, for example, the output of the G pixels linearly increases as the incident light intensity increases.

When the incident light intensity exceeds I1 and the output of the G pixels reaches the saturation level sat, however, the linearity of the output with respect to the incident light intensity is lost in the R pixels, the B pixels, and the IR pixels. This is because, in response to saturation of the G pixels, the excessive signal charges unable to be accumulated any more in the G pixels overflow and are added to the signal charges of the adjacent R pixels, B pixels, and IR pixels.

Further, when the incident light intensity exceeds I2 and, in addition to the G pixels, the output of the R pixels also reaches the saturation level sat, the linearity of the output with respect to the incident light intensity is lost again in the B pixels and the IR pixels. This is because, in response to saturation of the R pixels and the G pixels, the excessive signal charges unable to be accumulated any more in the R pixels and the G pixels overflow and are added to the signal charges of the adjacent B pixel and IR pixel.

Furthermore, when the incident light intensity exceeds I3 and, in addition to the R pixels and the G pixels, the output of the B pixels also reaches the saturation level, the linearity of the output of the IR pixels with respect to the incident light intensity is lost again. This is because, in response to saturation of the R pixels, G pixels, and B pixels, the excessive signal charges unable to be accumulated any more in the R pixels, G pixels, and B pixels overflow and are added to the signal charges of the adjacent IR pixels.

When illustrating the IR pixels as an example, if there is no signal charge leaking from an adjacent pixel due to blooming, the linearity of the output of the IR pixels will be maintained over a range from an intensity below the incident light intensity I1 to an intensity exceeding the incident light intensity I3 as indicated by a dotted line in FIG. 5. That is, the difference between the characteristic indicated by the dash-dot-dot-dash line and the characteristic indicated by the dotted line is the color mixture component due to blooming. Although not illustrated in FIG. 5, the same applies to the color mixture components due to blooming in the R pixels and the B pixels.

Some imaging devices including visible light pixels and infrared light pixels may perform signal processing of subtracting an output signal of an infrared light pixel from an output signal of a visible light pixel. FIG. 6 is a graph illustrating one example of spectral sensitivity characteristics in R pixels, G pixels, B pixels, and IR pixels. In FIG. 6, an infrared component superimposed on the output of the IR pixels is included in the output of each of the R pixels, the G pixels, and the B pixels. In such a case, it is therefore desirable to perform signal processing of subtracting the output signal of the infrared light pixel from the output signal of the visible light pixel to remove the infrared component from the output of the visible light pixel, for example.

When a blooming component from the visible light pixel is superimposed on the signal of the infrared light pixel, however, even if signal processing of subtracting the output signal of the infrared light pixel from the output signal of the visible light pixel is performed, the infrared component cannot be appropriately removed from the output of the visible light pixel.

Accordingly, in the imaging device according to the present embodiment, the procedure described below makes it possible to remove the blooming component superimposed on a signal from the infrared light pixel and perform signal processing with higher accuracy on a signal of the visible light pixel.

Figure 7:
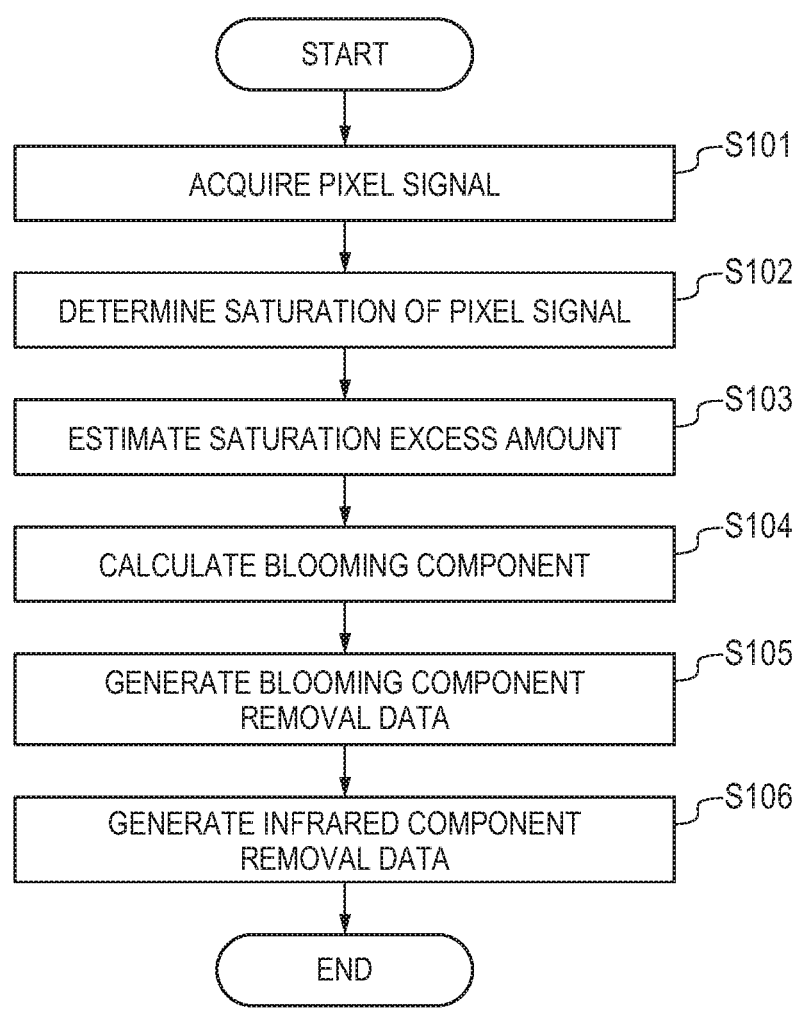
FIG. 7 is a flowchart illustrating a correction method of a pixel signal in the imaging device according to the first embodiment of the present invention.

Next, a correction method of the pixel signal in the imaging device according to the present embodiment will be described with reference to FIG. 7. FIG. 7 is a flowchart illustrating a signal processing method in the imaging device according to the present embodiment.

In the imaging device according to the present embodiment, the correction for the pixel signal is performed by performing the process from step S101 to step S106 described below on a pixel signal output from the image pickup device 110.

First, in step S101, the correction processing unit 120 acquires pixel signals of each pixel 12 from the image pickup device 110. Here, a pixel signal value of the R pixel acquired from the image pickup device 110 is denoted as s_R, a pixel signal value of the G pixel is denoted as s_G, a pixel signal value of the B pixel is denoted as s_B, and a pixel signal value of the IR pixel is denoted as s_IR.

Next, in step S102, the saturation flag generation unit 122 determines whether or not the pixel signal value of each pixel 12 acquired from the image pickup device 110 reaches the saturation level sat. As a result of the determination, if a pixel signal value reaches the saturation level sat, the saturation flag generation unit 122 sets a saturation flag Flag of the corresponding pixel 12 to "1". On the other hand, as a result of the determination, if the pixel signal value does not reach the saturation level sat, the saturation flag generation unit 122 sets the saturation flag Flag of the corresponding pixel 12 to "0". Note that, in the following description, when distinguishing the saturation flag Flag of each of R pixels, G pixels, B pixels, and IR pixels, each is referred to as a saturation flag FlagR, a saturation flag FlagG, a saturation flag FlagB, and a saturation flag FlagIR.

Next, in step S103, the saturation excess amount estimation unit 124 estimates a saturation excess amount Δsat in the pixel in which the pixel signal value reaches the saturation level sat. By performing preliminary capturing, before the actual capturing, with an exposure time period that is short enough not to cause saturation of the pixel 12 to acquire the pixel signal at that time, it is possible to estimate the saturation excess amount Δsat from the relationship between the exposure time period and the pixel signal at that time. In such a case, the saturation excess amount Δsat is expressed as follows, where Ta is the exposure time period during the preliminary capturing, s is the output level of the pixel signal, T is the exposure time period during the actual capturing, and sat is the saturation level.

$$\Delta sat = s \times T/Ta - sat$$

That is, the saturation excess amount Δsat is a difference between the saturation level sat of the pixel signal and an output level (s×t/ta) of the pixel signal expected for an actual incident light amount when it is assumed that the pixel 12 is not saturated. Note that, in the following description, when distinguishing the saturation excess amount Δsat of each of R pixels, G pixels, B pixels, and IR pixels, each is referred to as a saturation excess amount ΔsatR, a saturation excess amount ΔsatG, a saturation excess amount ΔsatB, and a saturation excess amount ΔsatIR.

Next, in step S104, the correction value generation unit 126 calculates a blooming component superimposed on the pixel signal of the pixel 12 of interest. This blooming component is a first correction value to be subtracted from the pixel signal. To calculate the blooming component, the saturation flags Flag, the saturation excess amounts Δsat, and correction coefficients (blooming ratios br) stored in the correction coefficient storage unit 128 of the eight pixels 12 adjacent to the pixel 12 of interest are used.

Herein, the blooming ratio br may be defined as a ratio (inflow ratio) of an inflow amount of charges to another pixel 12 with respect to the total amount of charges that exceed the saturation charge amount and overflow from one pixel 12. It is assumed here that blooming may occur to the pixel 12 located at the center of a pixel block having three rows by three columns from the adjacent eight surrounding pixels 12 thereof in each of the vertical direction, the horizontal direction, and the diagonal direction (see FIG. 4A to FIG. 4D). Further, although the blooming from one pixel 12 to the eight surrounding pixels 12 is not always even due to arrangement of elements inside the pixel 12 or the like, it is assumed here that the blooming occurs at the same ratio for simplified illustration. When the charges that overflow from one pixel 12 evenly contribute to the eight surrounding pixels 12 as the blooming component, the blooming ratio br is 0.125 at the maximum. When a change amount of output level corresponding to the amount of charges that overflow from one pixel 12 is represented by the saturation excess amount Δsat, a change amount of output level corresponding to the amount of charges that overflow from the pixel 12 and flow into another pixel 12 is Δsat×br. The blooming ratio br is acquired by performing preliminary capturing or the like and stored in the correction coefficient storage unit 128 in advance.

In the case of the CF arrangement illustrated in FIG. 4A to FIG. 4D, since the R pixel is surrounded by the two G pixels, the four B pixels, and the two IR pixels (see FIG. 4B), a blooming component BL_R superimposed on the pixel signal of the R pixel is expressed as Equation (1) below.

$$BL\_R = 2 \times \Delta satG \times br \times FlagG + 4 \times \Delta satB \times br \times FlagB + 2 \times \Delta satIR \times br \times FlagIR \quad \text{Equation (1)}$$

Further, since the G pixel is surrounded by the two R pixels, the two B pixels, and the four IR pixels (see FIG. 4C), a blooming component BL_G superimposed on the pixel signal of the G pixel is expressed as Equation (2) below.

$$BL\_G = 2 \times \Delta satR \times br \times FlagR + 2 \times \Delta satB \times br \times FlagB + 4 \times \Delta satIR \times br \times FlagIR \quad \text{Equation (2)}$$

Further, since the B pixel is surrounded by the four R pixels, the two G pixels, and the two IR pixels (see FIG. 4D), a blooming component BL_B superimposed on the pixel signal of the B pixel is expressed as Equation (3) below.

$$BL\_B = 4 \times \Delta satR \times br \times FlagR + 2 \times \Delta satG \times br \times FlagG + 2 \times \Delta satIR \times br \times FlagIR \quad \text{Equation (3)}$$

Further, since the IR pixel is surrounded by the two R pixels, the four G pixels, and the two B pixels (see FIG. 4A), a blooming component BL_IR superimposed on the pixel signal of the IR pixel is expressed as Equation (4) below.

$$BL\_IR = 2 \times \Delta satR \times br \times FlagR + 4 \times \Delta satG \times br \times FlagG + 2 \times \Delta satB \times br \times FlagB \quad \text{Equation (4)}$$

Since the saturation excess amount Δsat and the saturation flag Flag are zero in the pixel 12 that is not saturated, the value of the item related to the blooming component from that pixel 12 is zero.

The blooming components BL_R, BL_G, BL_B, and BL_IR calculated in such a way are the correction values for the pixel signals of each of the R pixel, G pixel, B pixel, and the IR pixels.

Note that, for simplified illustration here, it is assumed that the same type of pixels 12 out of eight pixels adjacent to the pixel 12 of interest have the same pixel signal value. The blooming components from the eight pixels 12 adjacent to the pixel 12 of interest may be calculated, respectively, and the calculated blooming components may be summed.

Next, in step S105, the calculation unit 130 subtracts the correction value calculated in step S104 from the pixel signal value of the pixel 12 of interest and generates blooming component removal data. In such a way, the component (blooming component) included in the pixel signal of the pixel 12 of interest and based on an inflow amount of charges from another adjacent pixel is reduced from the pixel signal of the pixel 12 of interest. The blooming component removal data, that is, original pixel signal values t_R, t_G, t_B, and t_IR of the R pixel, the G pixel, the B pixel, and the IR pixel from which the blooming components are removed are expressed as Equation (5) to Equation (8) below.

$$t\_R = s\_R - BL\_R \quad \text{Equation (5)}$$

$$t\_G = s\_G - BL\_G \quad \text{Equation (6)}$$

$$t\_B = s\_B - BL\_B \quad \text{Equation (7)}$$

$$t\_IR = s\_IR - BL\_IR \quad \text{Equation (8)}$$

Next, in step S106, the calculation unit 130 subtracts the blooming component removal data of the IR pixel in contact with each pixel from each blooming component removal data of the R pixel, the G pixel, and the B pixel and generates infrared component removal data. Pixel signal values OUT_R, OUR_G, and OUT_B of the R pixel, the G pixel, and the B pixel from which the infrared components have been removed are expressed as Equation (9) to Equation (11) below.

$$\text{OUT}\_R = t\_R - t\_IR \quad \text{Equation (9)}$$

$$\text{OUT}\_G = t\_G - t\_IR \quad \text{Equation (10)}$$

$$\text{OUT}\_B = t\_B - t\_IR \quad \text{Equation (11)}$$

As described above, by removing the blooming component from the pixel signal acquired from the image pickup device 110 and further removing the infrared components from the pixel signals of the visible light pixels, it is possible to perform a correction process with higher accuracy on the pixel signal of the visible light pixel.

Note that, in the present embodiment, although it is assumed that blooming occurs from the adjacent eight surrounding pixels 12 in each of the vertical direction, the horizontal direction, and the diagonal direction to the pixel 12 located at the center of the pixel block with three rows by three columns, blooming components from more outer pixels 12 may be taken into consideration.

Further, in the present embodiment, although it is assumed that the blooming occurs evenly from one pixel 12 to the eight surrounding pixels 12 thereof, the blooming ratio br is not necessarily required to be even. In general, the blooming ratios br in the vertical direction, the horizontal direction, and the diagonal direction are different from each other in accordance with the structure, the physical arrangement, a wire connection of a circuit, or the like of the pixel 12. Accordingly, in accordance with the direction in which the pixels 12 are adjacent to each other, the blooming ratio br may be appropriately changed.

For example, a blooming ratio br_vu from the adjacent top pixel in the vertical direction and a blooming ratio br_vl from the adjacent bottom pixel in the vertical direction can be separately set. Further, a blooming ratio br_hr from the adjacent right pixel in the horizontal direction and a blooming ratio br_hl from the adjacent left pixel in the horizontal direction can be separately set. Further, a blooming ratio br_ur from the adjacent top right pixel in the diagonal direction and a blooming ratio br_ul from the adjacent top left pixel in the diagonal direction can be separately set. Further, a blooming ratio br_lr from the adjacent bottom right pixel in the diagonal direction and a blooming ratio br_ll from the adjacent bottom left pixel in the diagonal direction can be separately set. The blooming ratio br can be separately set for all directions in which the pixels 12 are adjacent.

As described above, in the present embodiment, accurate blooming correction can be realized for output signals of an image pickup device including visible light pixels and infrared light pixels. Note that, although signals of the IR pixel are subtracted from signals of the visible light pixels in the present embodiment, the subtraction process described above may be performed after other correction processes, a process for providing offset, or the like are performed on respective signals. Further, after the signals of the IR pixels is subtracted from the signals of the visible light pixels, other correction processes, a process for providing offset, or the like may be performed. That is, in the present embodiment, signals corresponding to a difference between signals of the visible light pixels and signals of the IR pixels may be obtained.

Second Embodiment

Figure 8:
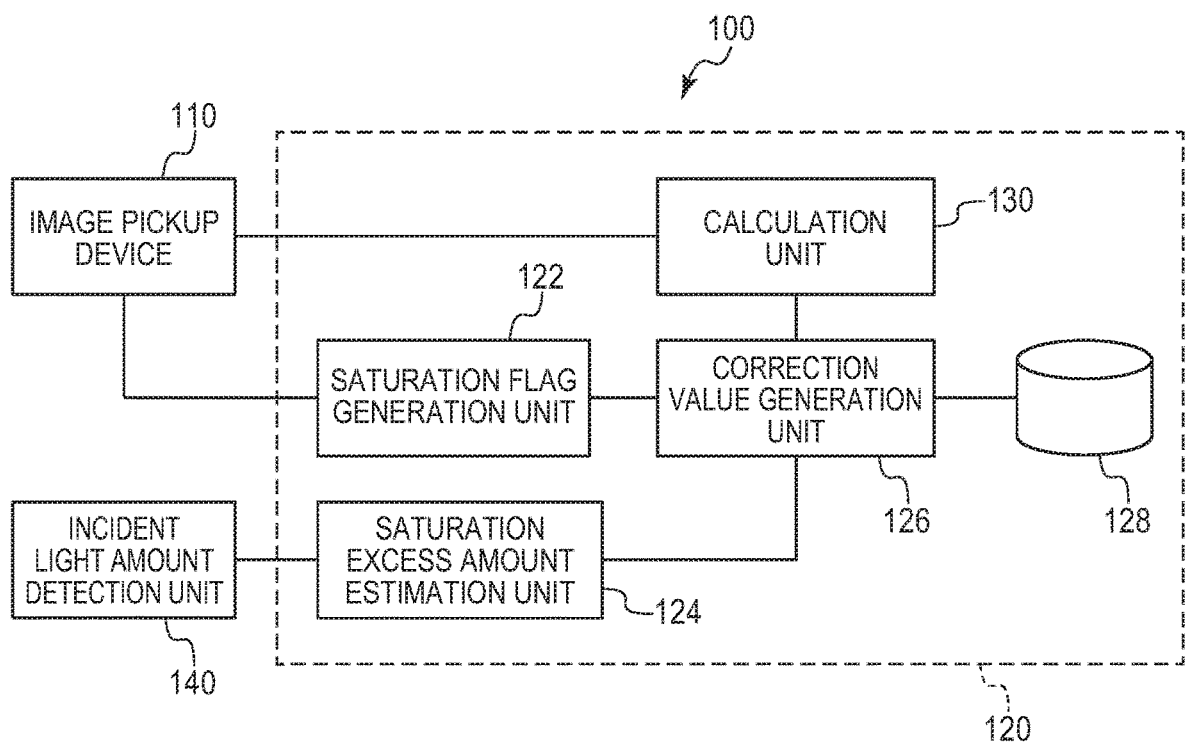
FIG. 8 is a block diagram illustrating a general configuration of an imaging device according to a second embodiment of the present invention.

An imaging device according to a second embodiment of the present invention will be described with reference to FIG. 8. The same components as those of the imaging device according to the first embodiment will be labeled with the same references, and the description thereof will be omitted or simplified. FIG. 8 is a block diagram illustrating a general configuration of the imaging device according to the present embodiment.

As illustrated in FIG. 8, the imaging device 100 according to the present embodiment includes the image pickup device 110 and the correction processing unit 120 described in the first embodiment and further includes an incident light amount detection unit 140. The incident light amount detection unit 140 is connected to the saturation excess amount estimation unit 124.

The incident light amount detection unit 140 detects an incident light amount to the pixel 12 and supplies information on the detected incident light amount to the saturation excess amount estimation unit 124. Based on the information on the incident light amount to the pixel 12 supplied from the incident light amount detection unit 140, the saturation excess amount estimation unit 124 estimates the saturation excess amount Δsat.

Information on the incident light amount supplied from the incident light amount detection unit 140 to the saturation excess amount estimation unit 124 provides an output level of the pixel signal expected for the actual incident light amount when it is assumed that the pixel 12 is not saturated. Even when the output level of the pixel 12 exceeds the saturation level, the information on the incident light amount is acquired from the incident light amount detection unit 140, and thereby the saturation excess amount Δsat can be estimated from the difference between the output level expected from the information and the saturation level sat.

In the imaging device according to the present embodiment, since the saturation excess amount Δsat can be estimated based on the information on the incident light amount supplied from the incident light amount detection unit 140 during actual capturing, it is not necessarily required to perform preliminary capturing before actual capturing as in the case of the first embodiment.

Since a method of correcting pixel signals in the imaging device according to the present embodiment is the same as that in the first embodiment, the description thereof will be omitted here.

As described above, according to the present embodiment, accurate blooming correction can be realized for output signals of an image pickup device including visible light pixels and infrared light pixels.

Third Embodiment

An imaging system according to a third embodiment of the present invention will be described with respect to FIG. 9. FIG. 9 is a block diagram illustrating a general configuration of an imaging system according to the present embodiment.

The imaging devices 100 described in the above first and second embodiments are applicable to various imaging systems. An example of applicable imaging system may be a digital still camera, a digital camcorder, a surveillance camera, a copier machine, a fax machine, a mobile phone, an on-vehicle camera, an observation satellite, or the like. Further, a camera module having an optical system such as a lens and an imaging device is also included in the imaging system. FIG. 9 illustrates a block diagram of a digital still camera as one example of the above.

An imaging system 200 illustrated in FIG. 9 as an example includes an imaging device 201, a lens 202 that captures an optical image of an object onto the imaging device 201, an aperture 204 for changing the amount of light passing through the lens 202, and a barrier 206 for protecting the lens 202. The lens 202 and the aperture 204 form an optical system that collects a light onto the imaging device 201. The imaging device 201 is the imaging device 100 described in any of the first and second embodiments and converts an optical image captured by the lens 202 into image data.

The imaging system 200 further includes a signal processing unit 208 that performs processing on an output signal output from the imaging device 201. The signal processing unit 208 generates image data from a digital signal output from the imaging device 201. Further, the signal processing unit 208 performs operations to perform various correction or compression, if necessary, and output image data. Further, the signal processing unit 208 can be configured so as to perform at least some of functions of the correction processing unit 120.

The imaging device 201 may include an analog-to-digital (AD) conversion unit that generates a digital signal to be processed in the signal processing unit 208. The AD conversion unit may be formed on a semiconductor substrate on which photoelectric converters of the imaging device 201 are formed or may be formed on a different semiconductor substrate from the substrate on which photoelectric converters of the imaging device 201 are formed. Further, the signal processing unit 208 and the imaging device 201 may be formed on the same semiconductor substrate.

Further, the imaging system 200 includes a memory unit 210 for temporarily storing image data therein and an external interface unit (external I/F unit) 212 for communicating with an external computer or the like. The imaging system 200 further includes a storage medium 214 such as a semiconductor memory for performing storage or readout of imaging data and a storage medium control interface unit (storage medium control I/F unit) 216 for performing storage or readout on the storage medium 214. Note that the storage medium 214 may be embedded in the imaging system 200 or may be removable.

Further, the imaging system 200 includes a general control/operation unit 218 that performs various calculation and controls the entire digital still camera and a timing generation unit 220 that outputs various timing signals to the imaging device 201 and the signal processing unit 208. Here, the timing signal or the like may be input from the outside, and the imaging system 200 may include at least the imaging device 201 and the signal processing unit 208 that processes an output signal output from the imaging device 201.

The imaging device 201 outputs an imaging signal to the signal processing unit 208. The signal processing unit 208 performs predetermined signal processing on the imaging signal output from the imaging device 201 and outputs image data. The signal processing unit 208 uses the imaging signal to generate an image.

As described above, according to the present embodiment, the imaging system to which the imaging device 100 according to the first and second embodiments is applied can be realized.

Fourth Embodiment

Figure 10A:
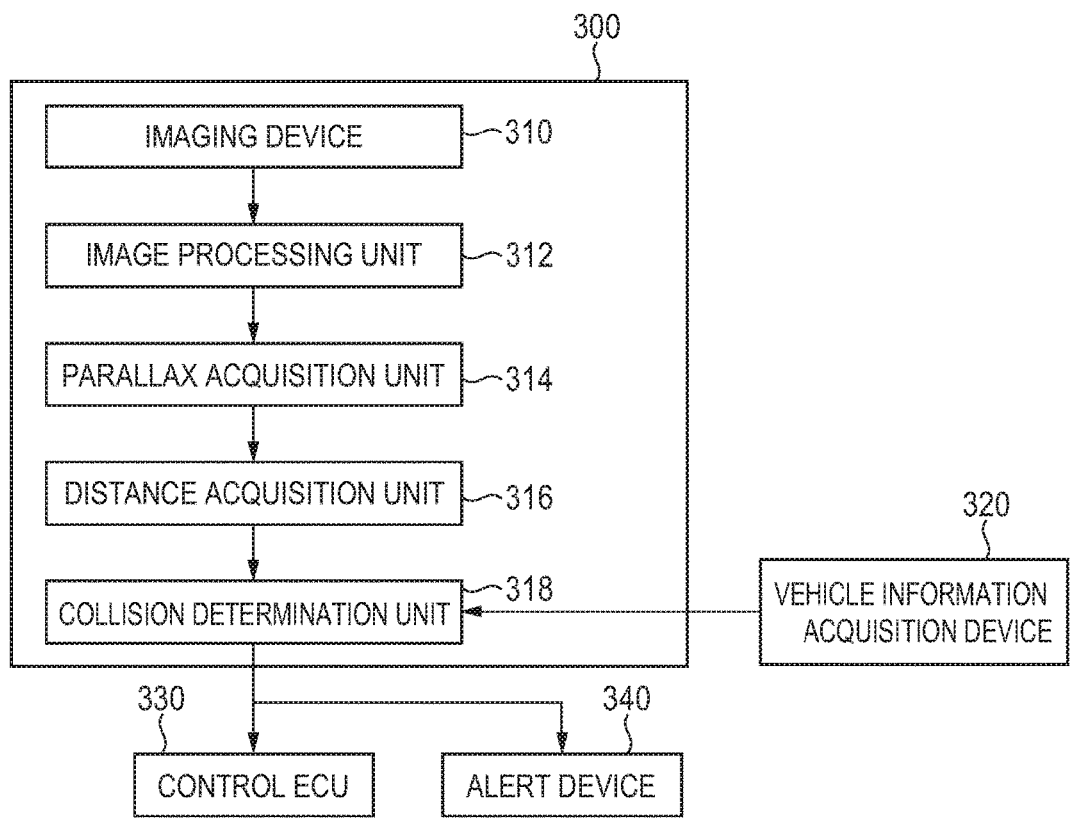
FIG. 10A is a diagram illustrating a configuration example of an imaging system according to a fourth embodiment of the present invention.
Figure 10B:
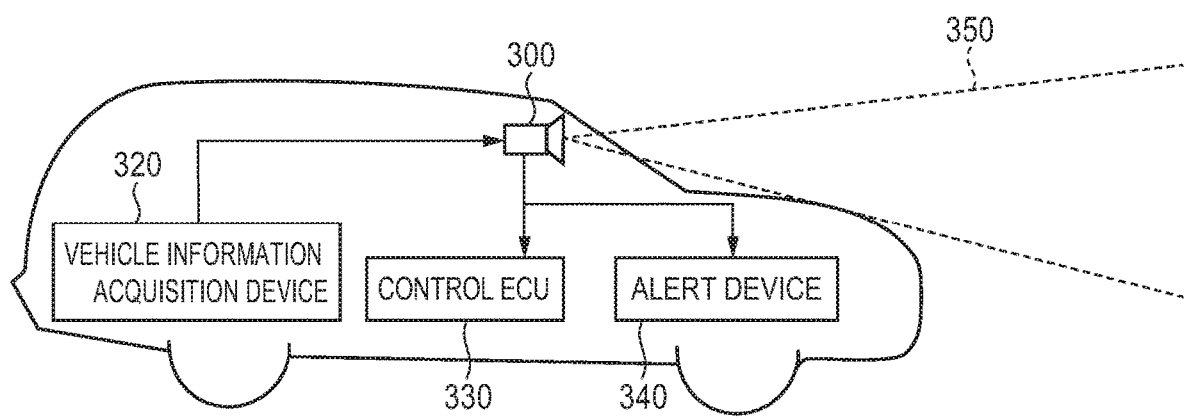
FIG. 10B is a diagram illustrating a configuration example of a movable object according to the fourth embodiment of the present invention.

An imaging system and a movable object according to a fourth embodiment of the present invention will be described with reference to FIG. 10A and FIG. 10B. FIG. 10A is a diagram illustrating a configuration of the imaging system according to the present embodiment. FIG. 10B is a diagram illustrating a configuration of the movable object according to the present embodiment.

FIG. 10A illustrates an example of an imaging system related to an on-vehicle camera. An imaging system 300 includes an imaging device 310. The imaging device 310 is the imaging device 100 described in any of the above first and second embodiments. The imaging system 300 includes an image processing unit 312 that performs image processing on a plurality of image data acquired by the imaging device 310 and a parallax acquisition unit 314 that calculates a parallax (a phase difference of parallax images) from the plurality of image data acquired by the imaging system 300. Further, the imaging system 300 includes a distance acquisition unit 316 that calculates a distance to an object based on the calculated parallax and a collision determination unit 318 that determines whether or not there is a collision possibility based on the calculated distance. Here, the parallax acquisition unit 314 and the distance acquisition unit 316 are an example of a distance information acquisition unit that acquires distance information on the distance to the object. That is, the distance information is information on a parallax, a defocus amount, a distance to an object, or the like. The collision determination unit 318 may use any of the distance information to determine the collision possibility. The distance information acquisition unit may be realized by dedicatedly designed hardware or may be realized by a software module. Further, the distance information acquisition unit may be realized by a field programmable gate array (FPGA), an application specific integrated circuit (ASIC), or the like or may be realized by a combination thereof.

The imaging system 300 is connected to the vehicle information acquisition device 320 and can acquire vehicle information such as a vehicle speed, a yaw rate, a steering angle, or the like. Further, the imaging system 300 is connected to a control ECU 330, which is a control device that outputs a control signal for causing a vehicle to generate braking force based on a determination result by the collision determination unit 318. Further, the imaging system 300 is also connected to an alert device 340 that issues an alert to the driver based on a determination result by the collision determination unit 318. For example, when the collision probability is high as the determination result of the collision determination unit 318, the control ECU 330 performs vehicle control to avoid a collision or reduce damage by applying a brake, pushing back an accelerator, suppressing engine power, or the like. The alert device 340 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 300. FIG. 10B illustrates the imaging system when a front area of a vehicle (a capturing area 350) is captured. The vehicle information acquisition device 320 transmits an instruction to the imaging system 300 or the imaging device 310. Such a configuration can further improve the ranging accuracy.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and can be applied to a movable object (moving apparatus) such as a ship, an airplane, or an industrial robot, for example. In addition, the imaging system can be widely applied to a device which utilizes object recognition, such as an intelligent transportation system (ITS), without being limited to movable objects.

Modified Embodiments

The present invention is not limited to the embodiments described above, and various modifications are possible. For example, an example in which a part of the configuration of any of the embodiments is added to another embodiment or an example in which a part of the configuration of any of the embodiments is replaced with a part of the configuration of another embodiment is also one of the embodiments of the present invention.

Further, although the image pickup device including R pixels, G pixels, and B pixels as visible light pixels has been described as an example in the embodiments described above, the visible light pixels are not necessarily limited thereto. For example, the image pickup device may include a C pixel having a cyan CF, a M pixel having a magenta CF, and a Y pixel having a yellow CF as the visible light pixels. Further, the image pickup device may further include a white pixel in which the transmission wavelength range of the visible light pixels is collectively included.

Further, the imaging systems illustrated in the third and fourth embodiments described above are examples of an imaging system to which the imaging device of the present invention may be applied, and an imaging system to which the imaging device of the present invention can be applied is not limited to the configuration illustrated in FIG. 9 and FIG. 10A.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-159426, filed Sep. 2, 2019, which is hereby incorporated by reference herein in its entirety.

What is claimed is:

1. An imaging device comprising:
   an image pickup device having a plurality of pixels; and
   a correction processing unit that corrects a signal output from the image pickup device,
   wherein the plurality of pixels includes a visible light pixel that receives light corresponding to a visible light wavelength range and an infrared light pixel that is arranged adjacent to the visible light pixel and receives light corresponding to an infrared wavelength range, and
   wherein the correction processing unit includes a calculation unit that performs a first process of reducing, from a pixel signal of the infrared light pixel, a component that is included in the pixel signal of the infrared light pixel and is based on an inflow amount of charges to the infrared light pixel from other pixel adjacent to the infrared light pixel and a second process of obtaining a signal corresponding to a difference between a pixel signal of the visible light pixel and a pixel signal of the infrared light pixel obtained after the first process.

2. The imaging device according to claim 1, wherein the other pixel is, out of the pixels adjacent to the infrared light pixel, a pixel in which charges exceeding a saturation charge amount are generated by incident light.

3. The imaging device according to claim 1, wherein the correction processing unit further includes
   a saturation flag generation unit that generates a saturation flag indicating whether or not saturation occurs for each of the plurality of pixels, and
   a saturation excess amount estimation unit that estimates a saturation excess amount that exceeds a saturation level of the pixel for a pixel in which the saturation flag indicates saturation.

4. The imaging device according to claim 3, wherein the calculation unit calculates the component based on the inflow amount from the other pixel to the infrared light pixel based on the saturation excess amount of the other pixel and an inflow ratio of charges from the other pixel to the infrared light pixel.

5. The imaging device according to claim 4, wherein the saturation excess amount estimation unit estimates, as the saturation excess amount, a difference between a pixel signal output level expected for an actual incident light amount when it is assumed that the pixel is not saturated and the saturation level.

6. The imaging device according to claim 5, wherein the pixel signal output level expected for an actual incident light amount is calculated based on an output level acquired by preliminary capturing performed with an exposure time period that causes no saturation of the pixel.

7. The imaging device according to claim 4,
   wherein the imaging device further includes an incident light amount detection unit that detects an incident light amount entering the image pickup device, and
   wherein the saturation excess amount estimation unit estimates, as the saturation excess amount, a difference between an output level detected by the incident light detection amount and the saturation level.

8. The imaging device according to claim 3, wherein the saturation excess amount estimation unit estimates, as the saturation excess amount, a difference between a pixel signal output level expected for an actual incident light amount when it is assumed that the pixel is not saturated and the saturation level.

9. The imaging device according to claim 8, wherein the pixel signal output level expected for an actual incident light amount is calculated based on an output level acquired by preliminary capturing performed with an exposure time period that causes no saturation of the pixel.

10. The imaging device according to claim 3,
wherein the imaging device further includes an incident light amount detection unit that detects an incident light amount entering the image pickup device, and
wherein the saturation excess amount estimation unit estimates, as the saturation excess amount, a difference between an output level detected by the incident light detection amount and the saturation level.

11. The imaging device according to claim 1, wherein the visible light pixel is an R pixel, a G pixel, or a B pixel.

12. An imaging system comprising:
the imaging device according to claim 1; and
a signal processing unit that processes a signal output from the imaging device.

13. A movable object comprising:
the imaging device according to claim 1;
a distance information acquisition unit that acquires distance information on a distance to an object, from a parallax image based on signals from the imaging device; and
a control unit that controls the movable object based on the distance information.

14. A signal processing device for processing a signal output from an image pickup device including a plurality of pixels, the signal processing device comprising
a calculation unit that performs a first process of subtracting, from a pixel signal of an infrared light pixel that receives light corresponding to an infrared wavelength range, a component based on an inflow amount of charges to the infrared light pixel from other pixel adjacent to the infrared light pixel and a second process of obtaining a signal corresponding to a difference between a pixel signal of a visible light pixel and a pixel signal of the infrared light pixel obtained after the first process.

15. The signal processing device according to claim 14 further comprising:
a saturation flag generation unit that generates a saturation flag indicating whether or not saturation occurs for each of the plurality of pixels, and
a saturation excess amount estimation unit that estimates a saturation excess amount that exceeds a saturation level of a pixel for the pixel in which the saturation flag indicates saturation.

16. The signal processing device according to claim 15, wherein the calculation unit calculates the component based on the inflow amount from the other pixel to the infrared light pixel based on the saturation excess amount of the other pixel and an inflow ratio of charges from the other pixel to the infrared light pixel.

17. A signal processing method for processing a signal output from an image pickup device including a plurality of pixels, the signal processing method comprising:
reducing, from a pixel signal of an infrared light pixel that receives light corresponding to an infrared wavelength range, a component that is included in the pixel signal of the infrared light pixel and is based on an inflow amount of charges to the infrared light pixel from other pixel adjacent to the infrared light pixel; and
obtaining a signal corresponding to a difference between a pixel signal of a visible light pixel and a pixel signal of the infrared light pixel obtained after the component based on the inflow amount of charges to the infrared light pixel from the other pixel is reduced.

* * * * *